United States Patent
Ali Pour Kallehbasti

(10) Patent No.: US 12,467,358 B2
(45) Date of Patent: Nov. 11, 2025

(54) VALIDATION FOR RESERVOIR FLOW DURING FORMATION TESTING

(71) Applicant: Halliburton Energy Services, Inc., Houston, TX (US)

(72) Inventor: Mehdi Ali Pour Kallehbasti, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 18/987,466

(22) Filed: Dec. 19, 2024

(65) Prior Publication Data

US 2025/0223904 A1 Jul. 10, 2025

Related U.S. Application Data

(63) Continuation of application No. 18/407,681, filed on Jan. 9, 2024, now Pat. No. 12,221,885.

(51) Int. Cl.
E21B 49/08 (2006.01)

(52) U.S. Cl.
CPC ............................... E21B 49/088 (2013.01)

(58) Field of Classification Search
CPC ........................... E21B 49/10; E21B 49/088
See application file for complete search history.

(56) References Cited

U.S. PATENT DOCUMENTS

| | | |
|---|---|---|
| 9,771,797 B2 | 9/2017 | Hemsing |
| 10,550,687 B2 | 2/2020 | Betancourt et al. |
| 10,550,692 B2 | 2/2020 | He et al. |
| 10,633,970 B2 | 4/2020 | He et al. |
| 11,156,083 B2 | 10/2021 | He et al. |
| 11,215,603 B2 | 1/2022 | Khan et al. |
| 11,359,480 B2 | 6/2022 | Jones et al. |
| 11,592,433 B2 | 2/2023 | Khan et al. |
| 11,761,332 B2 | 9/2023 | Jones et al. |
| 11,821,310 B2 | 11/2023 | Kallehbasti et al. |
| 2004/0020649 A1 | 2/2004 | Fields |
| 2005/0039527 A1 | 2/2005 | Dhruva et al. |
| 2006/0191332 A1 | 8/2006 | Manin et al. |

(Continued)

OTHER PUBLICATIONS

International Search Report and Written Opinion for International Patent Application No. PCT/US2024/012975 dated Sep. 30, 2024. PDF filed. 8 pages.

(Continued)

*Primary Examiner* — Shane Bomar
(74) *Attorney, Agent, or Firm* — Benjamin Ford; C. Tumey Law Group PLLC

(57) ABSTRACT

Disclosed herein are systems and methods to obtain representative formation pore pressure and formation mobility from pressure measurements with a formation testing tool. One of the methods for performing a pressure test includes measuring the pressure in the fluid passageway by a pressure sensor, performing a pre-test with the pressure sensor, measuring the drawdown pressure, measuring the buildup pressure, performing another pre-test when the drawdown pressure is superior to the buildup pressure, and validating a formation flow when the drawdown pressure is equal to the buildup pressure, wherein a measured pressure obtained at an asymptote of a pressure curve after the buildup pressure corresponds to the formation pore pressure.

20 Claims, 5 Drawing Sheets

(56) References Cited

U.S. PATENT DOCUMENTS

| | | |
|---|---|---|
| 2006/0219401 A1 | 10/2006 | Longfield et al. |
| 2013/0019672 A1 | 1/2013 | Hemsing |
| 2015/0112599 A1 | 4/2015 | Porett et al. |
| 2020/0284140 A1 | 9/2020 | Jones et al. |
| 2020/0370418 A1* | 11/2020 | Fries ............... E21B 47/06 |
| 2020/0378238 A1 | 12/2020 | Jones et al. |
| 2021/0047924 A1 | 2/2021 | Kallehbasti et al. |
| 2022/0074303 A1 | 3/2022 | Molla et al. |
| 2024/0011394 A1 | 1/2024 | Jones et al. |

OTHER PUBLICATIONS

Lee, et al., Results of Laboratory Experiments to Simulate the Downhole Environment of Formation Testing While Drilling, SPWLA 45th Annual Logging Symposium, Jun. 6-9, 2024.
Proett, et al., SPE49140, New Exact Spherical Flow Solution with Storage and Skin for Early-Time Interpretation with Applications to Wireline Formation and Early-Evaluation Drillstem testing, 1998.
Proett, et al., SPE84087, Formation Testing While Drilling, a New Era in Formation Testing, 2003.
Office Action Summary for U.S. Appl. No. 18/407,681 dated Sep. 25, 2024.
Notice of Allowance for U.S. Appl. No. 18/407,681 dated Nov. 8, 2024.

\* cited by examiner

VALIDATION FOR RESERVOIR FLOW DURING FORMATION TESTING

CROSS REFERENCE TO RELATED APPLICATIONS

This application is a continuation of U.S. patent application Ser. No. 18/407,681, filed Jan. 9, 2024, which is incorporated by reference in its entirety.

BACKGROUND

During oil and gas exploration, many types of information may be collected and analyzed. The information may be used to determine the quantity and quality of hydrocarbons in a reservoir and to develop or modify strategies for hydrocarbon production. For instance, the information may be used for reservoir evaluation, flow assurance, reservoir stimulation, facility enhancement, production enhancement strategies, and reserve estimation. One technique for collecting relevant information involves pressure testing a reservoir of interest at any specified depth. There are a variety of different tools such as formation testing tools that may be used to perform downhole formation pressure measurements. Formation testing tools may be conveyed downhole in a variety of ways, including wireline and drill string. Formation testing tools determine the formation pore pressure, estimate the formation mobility (ratio of permeability over viscosity or k/u), and can collect samples of reservoir fluids.

One of the challenges in the use of formation testing tools lies in low-mobility reservoirs as equilibration time is inversely proportional to the formation mobility. Further, equilibration is desirable for each pressure measurement, and measurements are made at several depths along a wellbore. Therefore, formation testing tools may operate a long time (up to several hours) for the pressure signal to equilibrate to the formation pressure. However, long waiting times with a stationary tool are undesirable in field operations as they increase both the rig time and the risk of differential tool sticking. Nevertheless, the information that formation testing tools can deliver is sufficiently valuable to operators that many are willing to wait, even hours, for the tool pressure to equilibrate to formation pressure if there is a guarantee that they will obtain good quality data.

The basic component of a formation testing tool for measuring the formation pore pressure is the tool flowline, which generally comprises a probe, a probe packer, a pretest piston, and a pressure sensor, all of which are connected by tubing. The probe can be any pad, any packer, or any portion of a tool that can form a sealed volume with the borehole wall and isolate fluid inside of the probe from fluids outside of the probe. A formation testing pressure measurement starts when the tool is stationed in the wellbore at the desired depth and the probe is extended to make contact with the formation. It is important for the packer to make a seal to hydraulically isolate the probe and the formation from the wellbore. After making a seal, in some tool designs, a piston that covers the probe orifice, known as the filter valve piston, is withdrawn. The filter valve piston is adapted to minimize the ingestion of solids in the tool flowline.

The pretest itself starts when a command is given to withdraw a pretest piston at a prescribed speed, $q_{piston}$, to increase the flowline volume by a prescribed amount, $\Delta V$. This is the drawdown period. The increase in the flowline volume causes a decrease in the flowline pressure, $P_{fl}$. Once the pretest piston stops, the flowline pressure, Pf, increases until it equilibrates to the formation pore pressure. This is known as the buildup period. The flowline pressure at the end of the drawdown and the rate of pressure changes during buildup depend on the pretest parameters, $q_{piston}$ and $\Delta V$, on formation properties (mobility $(k/\mu)$, and compressibility), and on the tool design (size of the probe orifice, flowline dead volume, and flowline compressibility $(c_{eff})$).

During measurement, the pressure sensor can measure the pressure of the fluids in the sealed connection volume which are in hydraulic communication with the fluids in the formation. The pressure value measured by the sensor can be processed by the formation testing tool or transmitted to a device outside of the borehole. However, fluid mobility may be a challenge for the fluid from formation to the probe and inside the flowline of the formation testing tool. Further, there may be some pressure changes during the drawdown period and buildup period due to changes in the compressibility of the formation fluid from the formation to the probe to the flowline of the formation testing tool, for example.

BRIEF DESCRIPTION OF THE DRAWINGS

These drawings illustrate certain aspects of some of the embodiments of the present disclosure, and should not be used to limit or define the disclosure.

DETAILED DESCRIPTION

Disclosed herein are systems and methods to obtain representative formation pore pressure and formation mobility from pressure measurements during drawdown and buildup periods by performing a series of pressure pre-tests and processing in real-time the pressure data acquired in each pre-test by analyzing pressure change during the drawdown and buildup periods through statistical analysis and denoising techniques. The formation pore pressure and the formation mobility are deemed representative when the pressure drop during the drawdown period is equal or close to total pressure increment in the pressure buildup period.

Formation pore pressure and formation mobility may be acquired during or after any other operations, such as during or after a drilling operation, injection operation, or foaming operation, for example. The systems and methods for obtaining representative formation pore pressure and formation mobility of the present disclosure can provide increased accuracy when faced with physical phenomena such as supercharging, wherein a measured formation pore pressure is artificially altered by a well operation and the measured pressure may not be equal to the true formation pore pressure. Supercharging may occur from an active influx of fluid from the wellbore into the formation. In embodiments, the systems and methods for obtaining representative formation pore pressure and formation mobility of the present disclosure include establishing a sealed connection volume between the formation testing tool and the formation, acquiring a series of pressure measurements during a drawdown and a buildup period, and analyzing the pressure data to ensure that the pressure drop during the drawdown period is equal or close to total pressure increment during the pressure buildup period before validating that the measured formation pore pressure and formation mobility are accurate. The sealed connection volume between the formation testing tool and the formation includes the volume between the formation and the pad of the formation testing tool, and the volume between the pad and the pressure sensor located in the formation testing tool. By measuring pressure changes over time using a pressure sensor in hydraulic communication with the formation and the probe also in hydraulic communication with the formation which isolates the probe from wellbore hydrostatic pressure, a pressure measurement system or device can overcome the influences that well operations can have on formation pore pressures.

Figure 1:
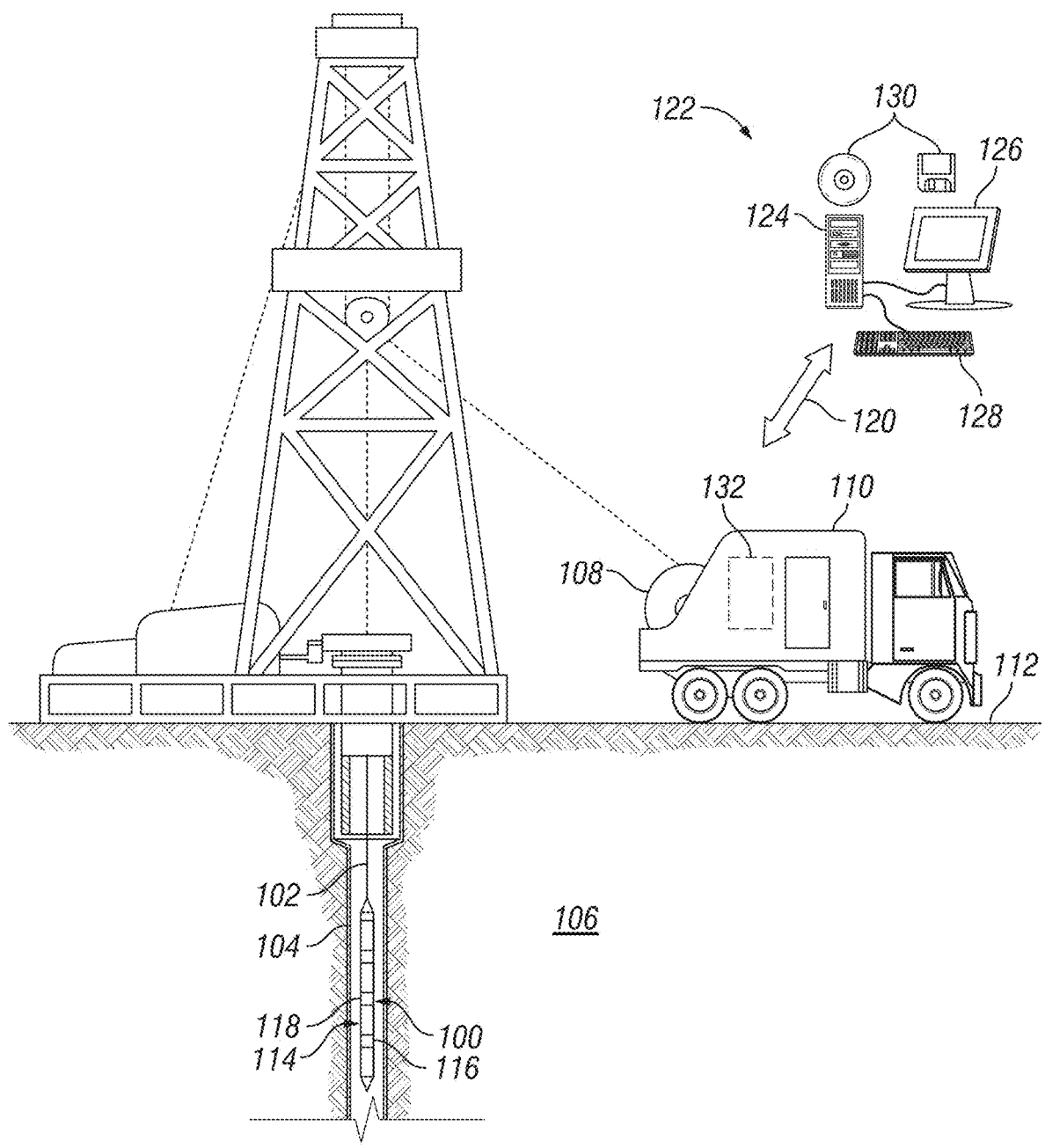
FIG. 1 is a schematic diagram of an example of a formation testing tool on a wireline.

FIG. 1 is a schematic diagram of a formation testing tool 100 on a conveyance 102. As illustrated, wellbore 104 may extend through subterranean formation 106. In examples, reservoir fluid may be contaminated with well fluid (e.g., drilling fluid) from wellbore 104. As described herein, the fluid sample may be analyzed to determine fluid contamination and other fluid properties of the reservoir fluid. As illustrated, a wellbore 104 may extend through subterranean formation 106. While the wellbore 104 is shown extending generally vertically into the subterranean formation 106, the principles described herein are also applicable to wellbores that extend at an angle through the subterranean formation 106, such as horizontal and slanted wellbores. For example, although FIG. 1 shows a vertical or low inclination angle well, high inclination angle or horizontal placement of the well and equipment is also possible. It should further be noted that while FIG. 1 generally depicts a land-based operation, those skilled in the art will readily recognize that the principles described herein are equally applicable to subsea operations that employ floating or sea-based platforms and rigs, without departing from the scope of the disclosure.

As illustrated, a hoist 108 may be used to run formation testing tool 100 into wellbore 104. Hoist 108 may be disposed on a vehicle 110. Hoist 108 may be used, for example, to raise and lower conveyance 102 in wellbore 104. While hoist 108 is shown on vehicle 110, it should be understood that conveyance 102 may alternatively be disposed from a hoist 108 that is installed at surface 112 instead of being located on vehicle 110. Formation testing tool 100 may be suspended in wellbore 104 on conveyance 102. Other conveyance types may be used for conveying formation testing tool 100 into wellbore 104, including coiled tubing and wired drill pipe, for example. Formation testing tool 100 may include a tool body 114, which may be elongated as shown on FIG. 1. Tool body 114 may be any suitable material, including without limitation titanium, stainless steel, alloys, plastic, combinations thereof, and the like. Formation testing tool 100 may further include one or more sensors 116 for measuring properties of the fluid sample, reservoir fluid, wellbore 104, subterranean formation 106, or the like. In examples, formation testing tool 100 may also include a fluid analysis module 118, which may be operable to process information regarding fluid sample, as described below. Formation testing tool 100 may be used to collect fluid samples from subterranean formation 106 and may obtain and separately store different fluid samples from subterranean formation 106.

In examples, fluid analysis module 118 may include at least one sensor that may continuously monitor a reservoir fluid. Such sensors include optical sensors, acoustic sensors, electromagnetic sensors, conductivity sensors, resistivity sensors, selective electrodes, density sensors, mass sensors, thermal sensors, chromatography sensors, viscosity sensors, bubble point sensors, fluid compressibility sensors, flow rate sensors. Sensors may measure a contrast between drilling fluid filtrate properties and formation fluid properties.

In examples, fluid analysis module 118 may be a gas chromatography analyzer (GC). A gas chromatography analyzer may separate and analyze compounds that may be vaporized without decomposition. Fluid samples from wellbore 104 may be injected into a GC column and vaporized. Different compounds may be separated due to their retention time difference in the vapor state. Analyses of the compounds may be displayed in GC chromatographs. In examples, a mixture of formation fluid and drilling fluid filtrate may be separated and analyzed to determine the properties within the formation fluid and drilling fluid filtrate.

Fluid analysis module 118 may be operable to derive properties and characterize the fluid sample. By way of example, fluid analysis module 118 may measure absorption, transmittance, or reflectance spectra and translate such measurements into component concentrations of the fluid sample, which may be lumped component concentrations, as described above. The fluid analysis module 118 may also measure gas-to-oil ratio, fluid composition, water cut, live fluid density, live fluid viscosity, formation pressure, and formation temperature. Fluid analysis module 118 may also be operable to determine fluid contamination of the fluid sample and may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, fluid analysis module 118 may include random access memory (RAM), one or more processing units, such as a central processing unit (CPU), or hardware or software control logic, ROM, and/or other types of nonvolatile memory.

Any suitable technique may be used for transmitting signals from the formation testing tool 100 to surface 112. As illustrated, a communication link 120 (which may be wired or wireless, for example) may be provided that may transmit data from formation testing tool 100 to an information handling system 122 at surface 112. Information handling system 122 may include a processing unit 124, a monitor 126, an input device 128 (e.g., keyboard, mouse, etc.), and/or computer media 130 (e.g., optical disks, magnetic disks) that can store code representative of the methods described herein. Information handling system 122 may act as a data acquisition system and possibly a data processing system that analyzes information from formation testing tool 100. For example, information handling system 122 may process the information from formation testing tool 100 for determination of fluid contamination. Information handling system 122 may also determine additional properties of the fluid sample (or reservoir fluid), such as component concentrations, pressure-volume-temperature properties (e.g., bubble point, phase envelop prediction, etc.) based on the fluid characterization. This processing may occur at surface 112 in real-time. Alternatively, the processing may occur downhole or at surface 112 or another location after recovery of formation testing tool 100 from wellbore 104. Alternatively, the processing may be performed by an information handling system in wellbore 104, such as fluid analysis module 118. The resultant fluid contamination and fluid properties may then be transmitted to surface 112, for example, in real-time.

It should be noted that in some examples, a gas chromatographer 132 may be disposed on surface 112 and analyze samples captures by formation testing tool 100. For example, fluid analysis module 118 may capture fluid samples and bring them to the surface 112 for analysis at the wellsite. As illustrated, gas chromatographer 132 may be disposed in vehicle 110. However, gas chromatographer 132 may be a standalone assembly that may be available at the wellsite. Additionally, information handling system 122 may be connected to gas chromatographer 132 through communication link 120. In examples, gas chromatographer 132 may operate and function as described above.

Figure 2:
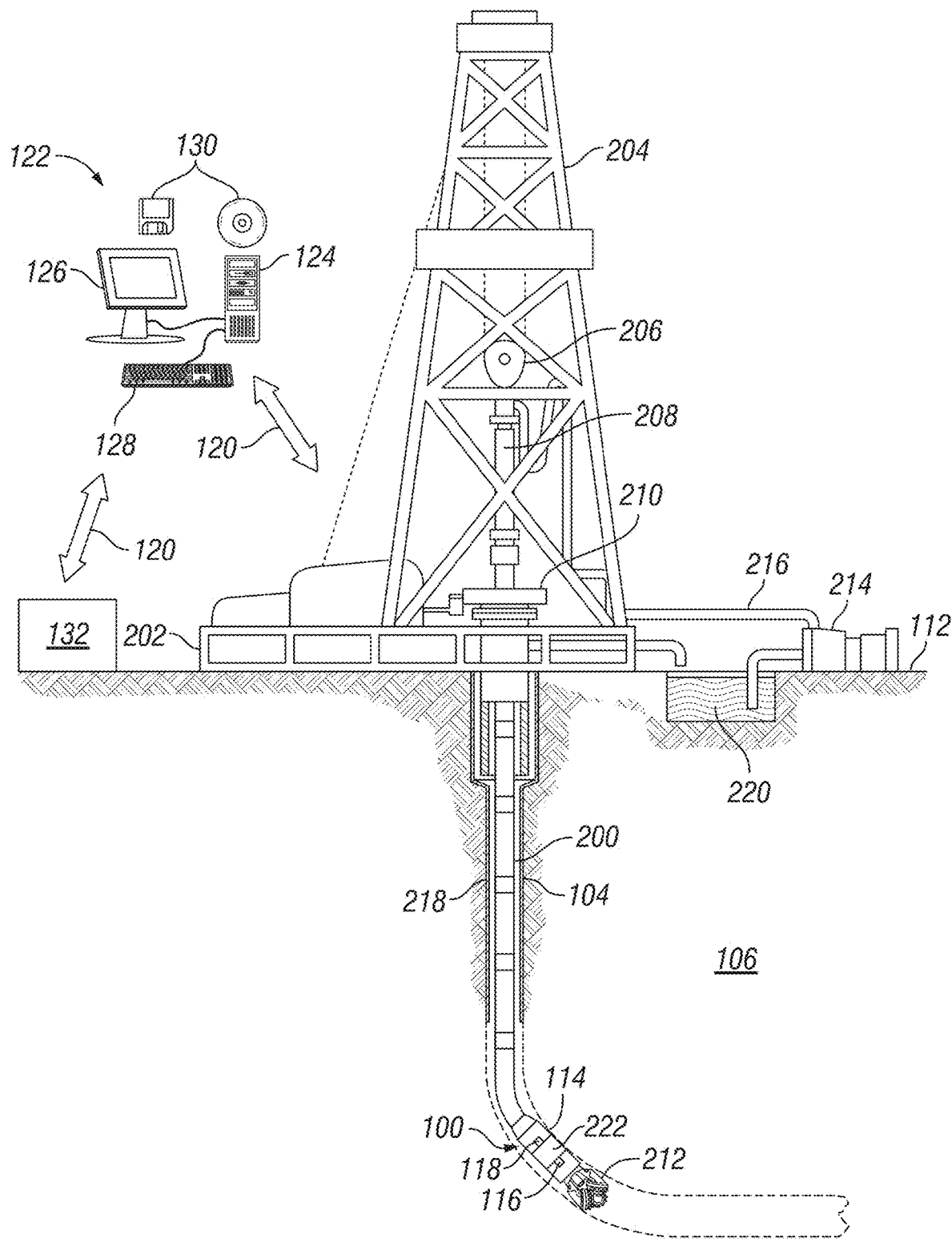
FIG. 2 is a schematic diagram of an example of the formation testing tool on a drill string.

Referring now to FIG. 2, FIG. 2 is a schematic diagram of a formation testing tool 100 disposed on a drill string 200 in a drilling operation. Formation testing tool 100 may be used to obtain a fluid sample, for example, a fluid sample of a reservoir fluid from subterranean formation 106. The reservoir fluid may be contaminated with well fluid (e.g., drilling fluid) from wellbore 104. As described herein, the fluid sample may be analyzed to determine fluid contamination and other fluid properties of the reservoir fluid. As illustrated, a wellbore 104 may extend through subterranean formation 106. While the wellbore 104 is shown extending generally vertically into the subterranean formation 106, the principles described herein are also applicable to wellbores that extend at an angle through the subterranean formation 106, such as horizontal and slanted wellbores. For example, although FIG. 2 shows a vertical and low inclination angle well, high inclination angle or horizontal placement of the well and equipment is also possible. It should further be noted that while FIG. 2 generally depicts a land-based operation, those skilled in the art will readily recognize that the principles described herein are equally applicable to subsea operations that employ floating or sea-based platforms and rigs, without departing from the scope of the disclosure.

As illustrated, a drilling platform 202 may support a derrick 204 having a traveling block 206 for raising and lowering drill string 200. Drill string 200 may include, but is not limited to, drill pipe and coiled tubing, as generally known to those skilled in the art. A kelly 208 may support drill string 200 as it may be lowered through a rotary table 210. A drill bit 212 may be attached to the distal end of drill string 200 and may be driven either by a downhole motor and/or via rotation of drill string 200 from the surface 112. Without limitation, drill bit 212 may include, roller cone bits, PDC bits, natural diamond bits, any hole openers, reamers, coring bits, and the like. As drill bit 212 rotates, it may create and extend wellbore 104 that penetrates various subterranean formations 106. A pump 214 may circulate drilling fluid through a feed pipe 216 to kelly 208, downhole through interior of drill string 200, through orifices in drill bit 212, back to surface 112 via annulus 218 surrounding drill string 200, and into a retention pit 220.

Drill bit 212 may be just one piece of a downhole assembly that may include one or more drill collars 222 and formation testing tool 100. Formation testing tool 100, which may be built into the drill collars 222) may gather measurements and fluid samples as described herein. One or more of the drill collars 222 may form a tool body 114, which may be elongated as shown on FIG. 2. Tool body 114 may be any suitable material, including without limitation titanium, stainless steel, alloys, plastic, combinations thereof, and the like. Formation testing tool 100 may be similar in configuration and operation to formation testing tool 100 shown on FIG. 1 except that FIG. 2 shows formation testing tool 100 disposed on drill string 200. Alternatively, the formation testing tool 100 may be lowered into the wellbore after drilling operations on a wireline.

Formation testing tool 100 may further include one or more sensors 116 for measuring properties of the fluid sample reservoir fluid, wellbore 104, subterranean formation 106, or the like. The properties of the fluid are measured as the fluid passes from the formation through the tool and into either the wellbore or a sample container. As fluid is flushed in the near wellbore region by the mechanical pump, the fluid that passes through the tool generally reduces in drilling fluid filtrate content, and generally increases in formation fluid content. Formation testing tool 100 may be used to collect a fluid sample from subterranean formation 106 when the filtrate content has been determined to be sufficiently low. Sufficiently low depends on the purpose of sampling. For some laboratory testing below 10% drilling fluid contamination is sufficiently low, and for other testing below 1% drilling fluid filtrate contamination is sufficiently low. Sufficiently low also depends on the nature of the formation fluid such that lower standards are generally needed, the lighter the oil as designated with either a higher GOR or a higher API gravity. Sufficiently low also depends on the rate of cleanup in a cost benefit analysis since longer pump out times utilized to incrementally reduce the contamination levels may have prohibitively large costs. As previously described, the fluid sample may include a reservoir fluid, which may be contaminated with a drilling fluid or drilling fluid filtrate. Formation testing tool 100 may obtain and separately store different fluid samples from subterranean formation 106 with fluid analysis module 118. Fluid analysis module 118 may operate and function in the same manner as described above. However, storing of the fluid samples in the formation testing tool 100 may be based on the determination of the fluid contamination. For example, if the fluid contamination exceeds a tolerance, then the fluid sample may not be stored. If the fluid contamination is within a tolerance, then the fluid sample may be stored in the formation testing tool 100.

As previously described, information from formation testing tool 100 may be transmitted to an information handling system 122, which may be located at surface 112. As illustrated, communication link 120 (which may be wired or wireless, for example) may be provided that may transmit data from formation testing tool 100 to an information handling system at surface 112. Information handling system may include a processing unit 124, a monitor 126, an input device 128 (e.g., keyboard, mouse, etc.), and/or computer media 130 (e.g., optical disks, magnetic disks) that may store code representative of the methods described herein. In addition to, or in place of processing at surface 112, processing may occur downhole (e.g., fluid analysis module 118). In examples, information handling system 122 may perform computations to estimate clean fluid composition.

As previously described above, a gas chromatographer 132 may be disposed on surface 112 and analyze samples captures by formation testing tool 100. For example, fluid analysis module 118 may capture fluid samples and bring them to the surface 112 for analysis at the wellsite. As illustrated, gas chromatographer 132 may be a standalone assembly that may be available at the wellsite. Additionally, information handling system 122 may be connected to gas chromatographer 132 through communication link 120. In examples, gas chromatographer 132 may operate and function as described above.

Figure 3:
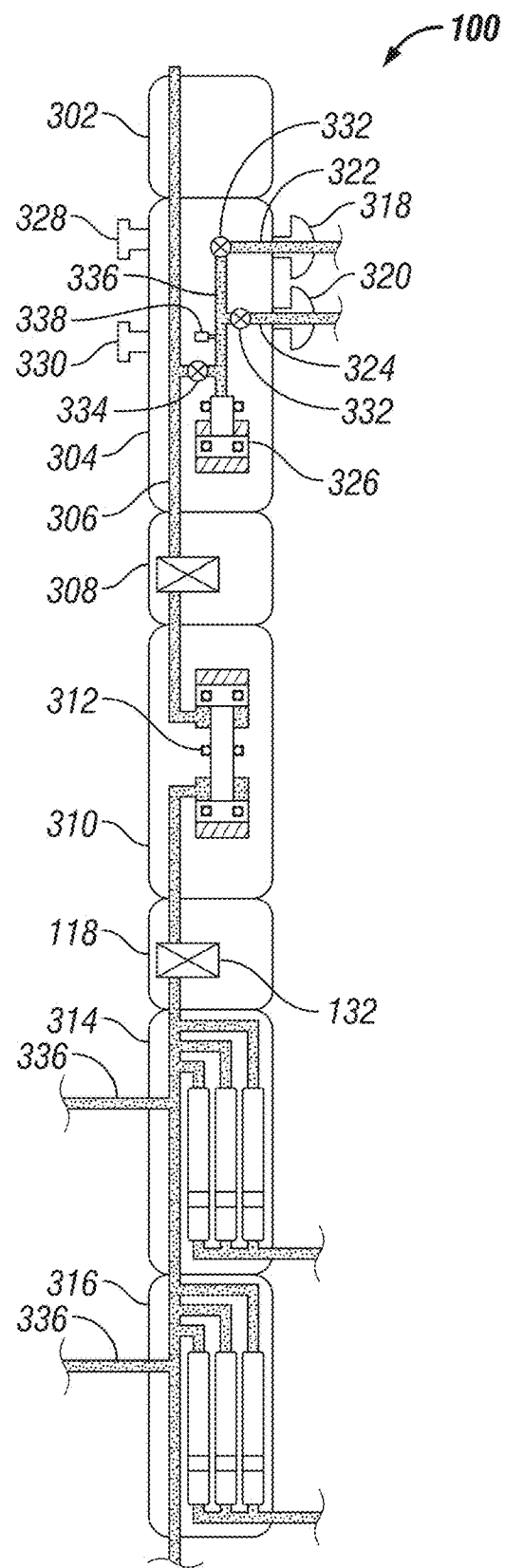
FIG. 3 is a schematic drawing of the formation testing tool.

FIG. 3 is a schematic of formation testing tool 100. In examples, formation testing tool 100 includes a power telemetry section 302 through which the tool communicates with other actuators and sensors 116 in drill string 200 or conveyance 102 (e.g., referring to FIGS. 1 and 2), and/or directly with a surface telemetry system (not illustrated). In examples, power telemetry section 302 may also be a port through which the various actuators (e.g. valves) and sensors (e.g., temperature and pressure sensors) in the formation testing tool 100 may be controlled and monitored. In examples, power telemetry section 302 includes a computer that exercises the control and monitoring function. In one embodiment, the control and monitoring function is performed by a computer in another part of the drill string or wireline tool (not shown) or by information handling system 122 on surface 112 (e.g., referring to FIGS. 1 and 2).

In examples, formation testing tool 100 includes a dual probe section 304, which extracts fluid from the reservoir and delivers it to a channel 306 that extends from one end of formation testing tool 100 to the other. Without limitation, dual probe section 304 includes two probes 318, 320 which may extend from formation testing tool 100 and press against the inner wall of wellbore 104 (e.g., referring to FIG. 1). Probe channels 322, 324 may connect probes 318, 320 to channel 306. The high-volume bidirectional pump 312 may be used to pump fluids from the reservoir, through probe channels 322, 324 and to channel 306. Alternatively, a low volume pump 326 may be used for this purpose. Two standoffs or stabilizers 328, 330 hold formation testing tool 100 in place as probes 318, 320 press against the wall of wellbore 104. In examples, probes 318, 320 and stabilizers 328, 330 may be retracted when formation testing tool 100 may be in motion and probes 318, 320 and stabilizers 328, 330 may be extended to sample the formation fluids at any suitable location in wellbore 104. Other probe sections include focused sampling probes, oval probes, or packers.

In examples, channel 306 may be connected to other tools disposed on drill string 200 or conveyance 102 (e.g., referring to FIGS. 1 and 2). In examples, formation testing tool 100 may also include a quartz gauge section 308, which may include sensors to allow measurement of properties, such as temperature and pressure, of fluid in channel 306. Additionally, formation testing tool 100 may include a flow-control pump out section 310, which may include a high-volume bidirectional pump 312 for pumping fluid through channel 306. In examples, formation testing tool 100 may include two multi-chamber sections 314, 316, referred to collectively as multi-chamber sections 314, 316 or individually as first multi-chamber section 314 and second multi-chamber section 316, respectively. Without limitation, formation testing tool 100 may also be used in pressure testing operations.

For example, during pressure testing operations, probes 318, 320 may be pressed against the inner wall of wellbore 104 (e.g., referring to FIG. 1). Pressure may increase at probes 318, 320 due to formation 106 (e.g., referring to FIG. 1 or 2) exerting pressure on probes 318, 320. As pressure rises and reaches a predetermined pressure, valves 332 opens to close equalizer valve 334, thereby isolating fluid passageway 336 from annulus 218. In this manner, valve 332 ensures that equalizer valve 334 closes only after probes 318, 320 has entered contact with mudcake (not illustrated) that is disposed against the inner wall of wellbore 104. In examples, as probes 318, 320 are pressed against the inner wall of wellbore 104, the pressure rises and closes the equalizer valve 334, thereby isolating the fluid passageway 336 from the annulus 218. In this manner, equalizer valve 334 may close before probes 318, 320 may have entered contact with the mudcake that lines the inner wall of wellbore 104. Fluid passageway 336, now close to annulus 218, is in fluid communication with low volume pump 326.

As low volume pump 326 is actuated, formation fluid may thus be drawn through probe channels 322, 324 and probes 318, 320. The movement of low volume pump 326 lowers the pressure in fluid passageway 336 to a pressure below the formation pressure, such that formation fluid is drawn through probe channels 322, 324 and probes 318, 320 and into fluid passageway 336. The pressure of the formation fluid may be measured in fluid passageway 336 while probes 318, 320 serve as a seal to prevent annular fluids from entering fluid passageway 336 and invalidating the formation pore pressure measurement.

With low volume pump 326 in its fully retracted position and formation fluid drawn into fluid passageway 336, the pressure will stabilize and enable pressure transducers 338 to sense and measure formation fluid pressure. The measured pressure is transmitted to information handling system 122 disposed on formation testing tool 100 and/or it may be transmitted to the surface via mud pulse telemetry or by any other conventional telemetry means to an information handling system 122 disposed on surface 112.

During this interval, pressure transducers 338 may continuously monitor the pressure in fluid passageway 336 until the pressure stabilizes, or after a predetermined time interval. When the measured pressure stabilizes, or after a predetermined time interval, for example at 1800 psi, and is sensed by pressure sensor 338 the drawdown operation may be complete. Once complete, fluid for the pressure test in fluid passageway 336 may be dispelled from formation testing tool 100 through the opening and/or closing of valves 332 and/or equalizer valve 334 as low volume pump 326 returns to a starting position.

During formation pressure test, an automated safe pressure test parameters of drawdown volume, drawdown rate, and drawdown pressure may be calculated before and/or during the pressure test. These parameters utilize an initialization of formation testing tool 100 (e.g., referring to FIG. 1) and formation safe drawdown pressure limits, rate limits, and volume limits. Utilizing the Darcy Flow Equation these three parameters define a safe envelop. An initial test is started with average (or pre-determined) initial drawdown values for each input. If during the course of a drawdown operation any position of this envelop is exceeded the drawdown is aborted and the buildup allowed to proceed, the drawdown parameters are reduced by a predetermined factor (e.g., two times) and a new set of safe parameters (upper and lower limits) may be calculated using the Darcy Flow Equation. As mentioned above, all pressure tests may operate within a safe envelop, however, the operation may not be optimized with the safe envelop.

Current technology may utilize the Darcy Flow Equation to calculate an idealized optimized test with one long full pressure test and apply the idealized optimized test to a second full pressure test because more than two pressure tests are not possible, however, the set of two full pressure tests may be longer than a set of two partial buildups and one full optimized buildup. A partial buildup is defined as when the pressure measured in a pressure test does not reach a steady-state formation pressure. A steady-state is defined as the stability of the pressure reading not changing significantly over a pre-determined time interval (e.g. 1 psi/min). It should be noted that the idealized buildup may be based on unreliable data, and often the first drawdown contains artifacts that may skew the direction.

Figure 4:
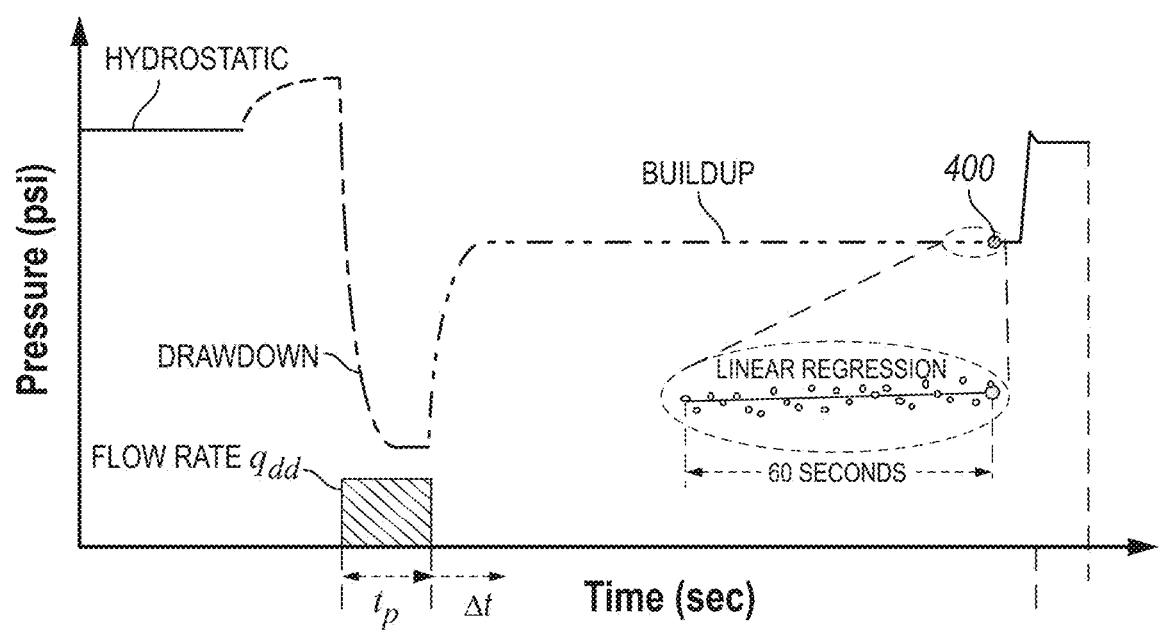
FIG. 4 is a graphical illustration of glossary used in pressure testing.

As illustrated in FIG. 4, the stability for a buildup is determined from slope 400 of a linear least-squares regression (LSR) line using the data from the last 60 seconds of a buildup operation. The same process is followed to obtain the temperature data. Ideally, the temperature stability would be zero because any transient in the pressure gauge temperature may contribute to a pressure error. Without limitation, temperature stability may be less than 0.001 F/see range and may have little effect on the pressure measurement.

In examples for pressure stability, slope 400 may depend on the formation mobility. However, this may not be the case because of near wellbore invasion of mud filtrate or even formation testing tool 100 electromechanical characteristics. If the mudcake that forms on the wellbore were a perfect hydraulic seal, then the formation mobility may have the most significant influence on the pressure stability. However, even a tiny fractional leakage of the mud filtrate through the mudcake may influence buildup stability. Using standard Least-Squares Regression (LSR) linear method, the following quantities may be determined:

$$b = \frac{\sum x_i y_i - \frac{1}{n}\sum x_i \sum y_i}{\sum x_i^2 - \frac{1}{n}\left(\sum x_i\right)^2} \quad (1)$$

$$a = \bar{y} - \bar{b}\cdot\bar{x} \quad (2)$$

where the pressure or temperature stability is represented by the linear equation, $$y = a + b\cdot x \quad (3)$$

and $y_i$ is the dependent variable of pressure or temperature and $x_i$ is the independent variable of time ($\bar{x}$ and $\bar{y}$ are the mean values of $x_i$ and $y_i$). It should be noted that this linear function may also be used to estimate the final pressure and temperature at the end of the buildup. The use of the LSR linear function to determine the final pressure and temperature reduces potential noise errors in the data. In downhole formation testing tools, the noise source may be mechanical systems, such as the hydraulic or electrical motors that are running. For logging while drilling tools, the borehole mud is normally circulating during a test. Pressure disturbances generated by a downhole mud pulser, surface mud pumps, or circulation turbulence may be a source of noise measured by the pressure gauge. In examples, the noise may exceed a standard deviation of ±1 psi. For this reason, the determination of the standard deviation is a quality control criterion that may be determined from the linear regression function as follows:

$$\sigma_y = \sqrt{\frac{\sum(y_i(a + b\cdot x_i))^2}{n-1}} \quad (4)$$

The quality of the drawdown pressure test is defined as a weighted average score of the different contributing variables (stability, mobility, radius of investigation, and supercharge) of a pressure test.

Figure 5:
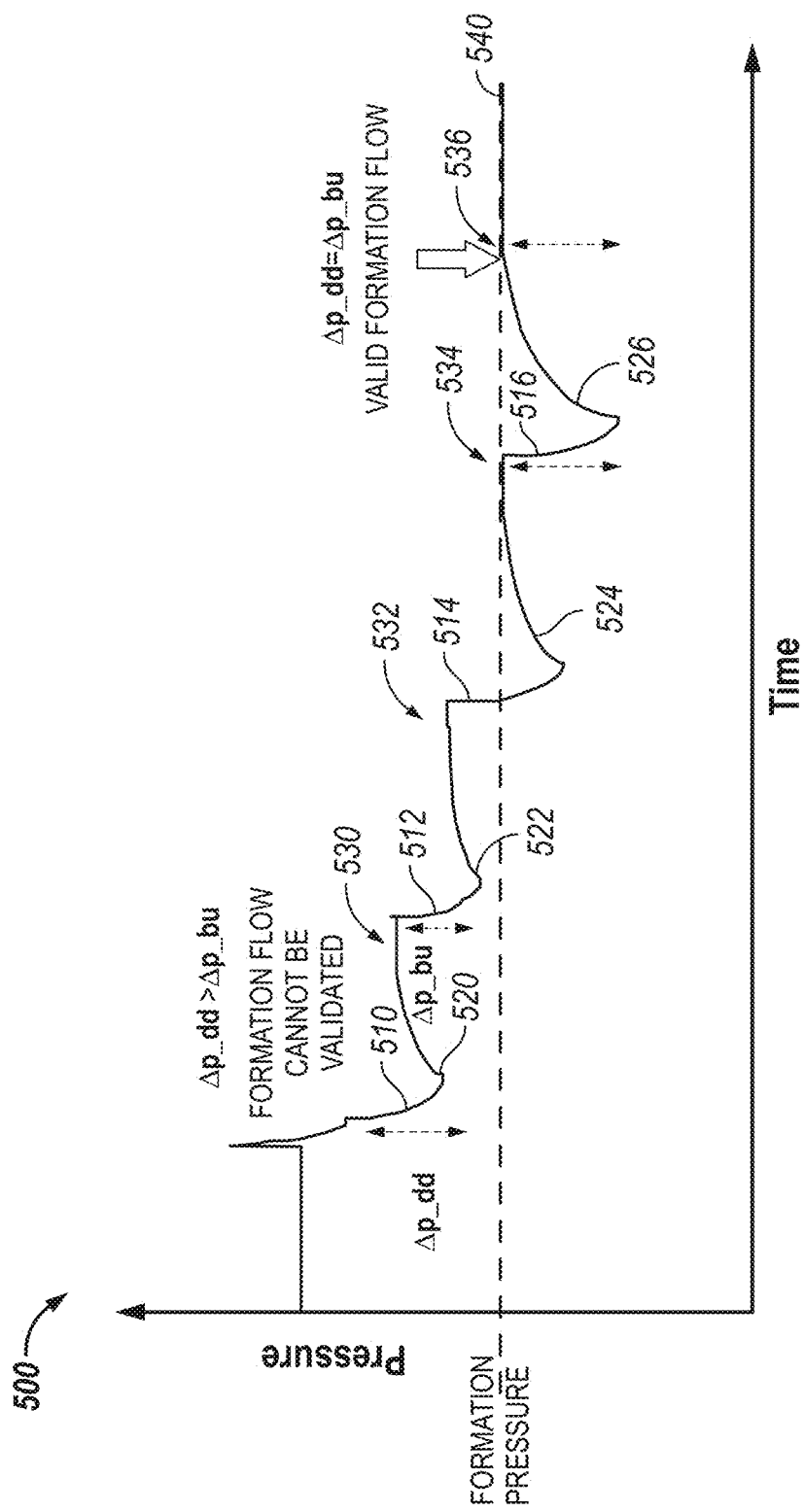
FIG. 5 is a graphical illustration of a series of pressure tests according to embodiments of the present disclosure.

Without limitation, comparison of the first initial pre-test to the second initial pre-test may provide a characterization of the formation, reservoirs within the formation, and nearest neighbors. However, if an additional pre-test is outside a tolerance pre-determined by personnel, it may be determined that the formation may need additional partial pressure tests to determine formation parameters. FIG. 5 illustrates successive pre-tests 500 measuring pressure as a function of time after the probe was sealed to the borehole, wherein the first three pre-tests are outside the tolerance. The pressure drops (Δp_dd in FIG. 5), or drawdown pressures, during the first three drawdown periods, 510, 512, 514, are higher than the buildup pressure (Δp_bu in FIG. 5), or buildup pressure, during the following three buildup periods, 520, 522, 524. The drawdown pressure (Δp_dd in FIG. 5) may be defined as the absolute value of the difference between a measured drawdown pressure at the beginning of a drawdown pressure period, 510, 512, or 514, and the measured drawdown pressure at the end of the drawdown pressure period, 510, 512, or 514. The buildup pressure (Δp_bu in FIG. 5) may be defined as the absolute value of the difference between the measured buildup pressure at the beginning of the buildup pressure period, 520, 522, or 524, and the measured buildup pressure at the end of the buildup pressure period, 520, 522, or 524. Therefore, the measured pressures at the asymptote of the first three curves, 530, 532, 534, are not deemed representative of the formation pore pressure 540 and the formation mobility cannot be calculated either according to embodiments of the present disclosure. Further, the formation fluid drawdown flow rate in drawdown period 510 is different than the formation fluid drawdown flow rate in drawdown period 512, which is different than the formation fluid drawdown flow rate in drawdown period 514.

However, the pressure drop (Δp_dd) at the fourth drawdown period 516 is equal to the pressure buildup (Δp_bu), or (Δp_dd=Δp_bu in FIG. 5) at the fourth buildup period 526. Therefore, the measured pressure at asymptote 536 is deemed representative of the formation pore pressure 540 and the formation mobility may be calculated according to embodiments of the present disclosure. Further, the measured pressure at the asymptote of the third buildup period, 534, is equal to the measured pressure at the asymptote 536 of the fourth buildup period. This confirms that the measured pressure after the third buildup period 534, which is equal to the measured pressure after the fourth buildup 526, is representative of the formation pore pressure 540 and the formation mobility may be calculated. Calculation may be performed as follows:

$$M_{s\_exact} = \left(\frac{14,696}{2\pi}\right)\left(\frac{Q_o}{\beta}\frac{\tau_p}{r_p}\right)(1 - e^{\frac{-\Delta t_p}{\alpha}}) \quad (5)$$

where $M_{s\_exact}$ is the exact mobility (k/μ, wherein the formation spherical permeability is in md and the fluid viscosity is in cP), $Q_o$ is the drawdown flow rate (cc/sec), $\tau_p$ is the probe geometric shape factor, β is the buildup magnitude, $r_p$ is the probe radius (cm), $\Delta t_p$ is drawdown time, and a is the time constant.

The preceding description provides various embodiments of systems and methods of use which may contain different method steps and alternative combinations of components. It should be understood that, although individual embodiments may be discussed herein, the present disclosure covers all combinations of the disclosed embodiments, including, without limitation, the different component combinations, method step combinations, and properties of the system.

Statement 1. A method for performing a pressure test comprising: inserting a formation testing tool into a wellbore, wherein the pressure testing tool includes: at least one probe; a pump disposed within the formation testing tool and connected to the at least one probe by at least one probe channel and at least one fluid passageway; and at least one stabilizer disposed on an opposite side of the formation testing tool as the at least one probe; identifying the formation testing tool parameters; activating the at least one stabilizer, wherein the at least one stabilizer is activated into a surface of the wellbore; activating the at least one probe, wherein the at least one probe is activated into a mudcake, wherein the mudcake is disposed on the surface of the wellbore; activating the pump, wherein a formation fluid is drawn in through the at least one probe into the at least one probe channel and the at least one fluid passageway by the pump and increasing pressure with the at least one fluid passageway; measuring the pressure in the at least one fluid passageway by a pressure sensor; performing a pre-test with the pressure sensor; measuring the drawdown pressure; measuring the buildup pressure; performing another pre-test when the drawdown pressure is superior to the buildup pressure; and validating a formation flow when the drawdown pressure is equal to the buildup pressure, wherein a measured pressure obtained at an asymptote of a pressure curve after the buildup pressure corresponds to a formation pore pressure.

Statement 2. The method of Statement 1, wherein the measured pressure obtained at the asymptote of the pressure curve after the buildup pressure is used to calculate formation mobility.

Statement 3. The method of any previous Statements 1 or 2, wherein the formation testing tool is disposed on a drill string.

Statement 4. The method of any previous Statements 1-3, wherein the formation testing tool is attached to a conveyance.

Statement 5. The method of Statement 4, wherein the conveyance is a wireline.

Statement 6. A method for performing a pressure test comprising: inserting a formation testing tool into a wellbore, wherein the pressure testing tool includes: at least one probe; a pump disposed within the formation testing tool and connected to the at least one probe by at least one probe channel and at least one fluid passageway; and at least one stabilizer disposed on an opposite side of the formation testing tool as the at least one probe; identifying the formation testing tool parameters; activating the at least one stabilizer, wherein the at least one stabilizer is activated into a surface of the wellbore; activating the at least one probe, wherein the at least one probe is activated into a mudcake, wherein the mudcake is disposed on the surface of the wellbore; activating the pump, wherein a formation fluid is drawn in through the at least one probe into the at least one probe channel and the at least one fluid passageway by the pump and increasing pressure with the at least one fluid passageway; measuring the pressure in the at least one fluid passageway by a pressure sensor; performing a pre-test with the pressure sensor; measuring the drawdown pressure; measuring the buildup pressure; performing another pre-test when the drawdown pressure is superior to the buildup pressure; and validating a formation flow by comparing stabilized pressure distribution of the two buildup pressures.

Statement 7. The method of Statement 6, wherein the comparing is performed based on statistical parameters.

Statement 8. The method of any previous Statements 6 or 7, wherein the statistical parameters comprise standard deviation and variance.

Statement 9. The method of any previous Statements 6-8, wherein the formation testing tool is disposed on a drill string.

Statement 10. The method of any previous Statements 6-9, wherein the formation testing tool is attached to a conveyance.

Statement 11. The method of Statement 10, wherein the conveyance is a wireline.

Statement 12. A system that may comprise a formation testing tool that may comprise at least one probe, a pressure sensor, a pump disposed within the formation testing tool and connected to the at least one probe by at least one probe channel and at least one fluid passageway, and at least one stabilizer disposed on an opposite side of the formation testing tool as the at least one probe. The system may further comprise an information handling system in communication with the formation testing tool. The information handling system is configured to record one or more pressure measurements taken in the at least one fluid passageway by the pressure sensor, instruct the formation testing tool to perform a pre-test, record measurements of a drawdown pressure, record measurements of a buildup pressure, and instruct the formation testing tool to perform another pre-test when the drawdown pressure is superior to the buildup pressure.

Statement 13. The system of Statement 12, wherein the information handling system is further configured to validate a formation flow when the drawdown pressure is equal to the buildup pressure, wherein a measured pressure obtained at an asymptote of a pressure curve after the buildup pressure corresponds to a formation pore pressure.

Statement 14. The system of Statement 13, wherein the measured pressure obtained at the asymptote of the pressure curve after the buildup pressure is used to calculate formation mobility.

Statement 15. The system of any previous Statements 12 or 13, wherein the information handling system is further configured to validate a formation flow by comparing stabilized pressure distribution of two successive buildup pressures.

Statement 16. The system of Statement 15, wherein the comparing is performed based on statistical parameters.

Statement 17. The system of Statement 16, wherein the statistical parameters comprise standard deviation and variance.

Statement 18. The system of any previous Statements 12, 13, or 15, wherein the formation testing tool is disposed on a drill string.

Statement 19. The system of any previous Statements 12, 13, 15, or 18, wherein the formation testing tool is attached to a conveyance.

Statement 20. The system of Statement 19, wherein the conveyance is a wireline.

It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the elements that it introduces.

Therefore, the present embodiments are well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Although individual embodiments are discussed, the disclosure covers all combinations of all those embodiments. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of the present disclosure. If there is any conflict in the usages of a word or term in this specification and one or more patent(s) or other documents that may be incorporated herein by reference, the definitions that are consistent with this specification should be adopted.

What is claimed is:

1. A method for performing a pressure test comprising:
inserting a formation testing tool into a wellbore, wherein the formation testing tool includes:
at least one probe;
a pump disposed within the formation testing tool and connected to the at least one probe by at least one probe channel and at least one fluid passageway; and
at least one stabilizer disposed on an opposite side of the formation testing tool as the at least one probe;
identifying parameters of the formation testing tool;
activating the at least one stabilizer, wherein the at least one stabilizer is activated into a surface of the wellbore;
activating the at least one probe, wherein the at least one probe is activated into a mudcake, wherein the mudcake is disposed on the surface of the wellbore;
activating the pump, wherein a formation fluid is drawn in through the at least one probe into the at least one probe channel and the at least one fluid passageway by the pump and increasing pressure with the at least one fluid passageway;
measuring the pressure in the at least one fluid passageway by a pressure sensor;
performing a first pre-test with the pressure sensor;
measuring a drawdown pressure, wherein the drawdown pressure is a difference between the measured drawdown pressure at a beginning of a drawdown pressure period and at an end of the drawdown pressure period;
measuring a buildup pressure, wherein the buildup pressure is a difference between the measured buildup pressure at a beginning of a buildup pressure period and at an end of the buildup pressure period;
performing an additional pre-test when the drawdown pressure is above the buildup pressure; and
validating a formation flow when the drawdown pressure is equal to the buildup pressure.

2. The method of claim 1, wherein a measured pressure obtained at an asymptote of a pressure curve after the buildup pressure corresponds to a formation pore pressure.

3. The method of claim 2, wherein the measured pressure obtained at the asymptote of the pressure curve after the buildup pressure is used to calculate formation mobility.

4. The method of claim 1, wherein performing the additional pre-test when the drawdown pressure is above the buildup pressure further comprises a formation fluid drawdown flow rate that is different than a formation fluid drawdown flow rate in the first pre-test.

5. The method of claim 1, wherein the formation testing tool is disposed on a drill string.

6. A method for performing a pressure test comprising:
inserting a formation testing tool into a wellbore, wherein the formation testing tool includes:
at least one probe;
a pump disposed within the formation testing tool and connected to the at least one probe by at least one probe channel and at least one fluid passageway; and
at least one stabilizer disposed on an opposite side of the formation testing tool as the at least one probe;
identifying parameters of the formation testing tool;
activating the at least one stabilizer, wherein the at least one stabilizer is activated into a surface of the wellbore;
activating the at least one probe, wherein the at least one probe is activated into a mudcake, wherein the mudcake is disposed on the surface of the wellbore;
activating the pump, wherein a formation fluid is drawn in through the at least one probe into the at least one probe channel and the at least one fluid passageway by the pump and increasing pressure with the at least one fluid passageway;
measuring the pressure in the at least one fluid passageway by a pressure sensor;
performing a first pre-test with the pressure sensor;
measuring a drawdown pressure, wherein the drawdown pressure is a difference between the measured drawdown pressure at a beginning of a drawdown pressure period and at an end of the drawdown pressure period;
measuring a buildup pressure, wherein the buildup pressure is a difference between the measured buildup pressure at a beginning of a buildup pressure period and at an end of the buildup pressure period;
performing an additional pre-test when the drawdown pressure is above the buildup pressure; and
validating a formation flow by comparing stabilized pressure distribution of the two buildup pressures.

7. The method of claim 6, wherein the validating is performed based on statistical parameters.

8. The method of claim 7, wherein the statistical parameters comprise standard deviation and variance.

9. The method of claim 6, wherein performing the additional pre-test when the drawdown pressure is above the buildup pressure comprises a formation fluid drawdown flow rate that is different than a formation fluid drawdown flow rate in the first pre-test.

10. The method of claim 6, wherein the formation testing tool is attached to a conveyance.

11. The method of claim 6, wherein the formation testing tool is disposed on a drill string.

12. A method for performing a pressure test comprising:
inserting a formation testing tool into a wellbore, wherein the formation testing tool includes:
at least one probe;
a pump disposed within the formation testing tool and connected to the at least one probe by at least one probe channel and at least one fluid passageway; and
at least one stabilizer disposed on an opposite side of the formation testing tool as the at least one probe;
identifying parameters of the formation testing tool;
activating the at least one stabilizer, wherein the at least one stabilizer is activated into a surface of the wellbore;
activating the at least one probe, wherein the at least one probe is activated into a mudcake, wherein the mudcake is disposed on the surface of the wellbore;
activating the pump, wherein a formation fluid is drawn in through the at least one probe into the at least one probe channel and the at least one fluid passageway by the pump and increasing pressure with the at least one fluid passageway;
measuring the pressure in the at least one fluid passageway by a pressure sensor;

performing a first pre-test with the pressure sensor;
measuring a drawdown pressure and measuring a rate of pressure change during a drawdown period;
measuring a buildup pressure and measuring a rate of pressure change during a buildup period;
performing an additional pre-test when the drawdown pressure is above the buildup pressure;
measuring a drawdown pressure and measuring a rate of pressure change during a second drawdown period; and
validating a formation flow when the rate of pressure change during the first drawdown period is equal to the rate of pressure change during the second drawdown period.

13. The method of claim 12, wherein a measured pressure obtained at an asymptote of a pressure curve after the buildup pressure corresponds to a formation pore pressure.

14. The method of claim 13, wherein the measured pressure obtained at the asymptote of the pressure curve after the buildup pressure is used to calculate formation mobility.

15. The method of claim 12, wherein validating the formation flow is performed by comparing stabilized pressure distribution of two successive buildup pressures.

16. The method of claim 12, wherein validating the formation flow is performed based on statistical parameters.

17. The method of claim 16, wherein the statistical parameters comprise standard deviation and variance.

18. The method of claim 12, wherein the formation testing tool is disposed on a drill string.

19. The method of claim 12, wherein performing the additional pre-test when the drawdown pressure is above the buildup pressure comprises a formation fluid drawdown flow rate that is different than a formation fluid drawdown flow rate in the first pre-test.

20. The method of claim 19, wherein the formation testing tool is conveyed by a wireline.

* * * * *